United States Patent
Schaad et al.

(10) Patent No.: US 6,826,960 B2
(45) Date of Patent: Dec. 7, 2004

(54) TRIAXIAL ACCELERATION SENSOR

(75) Inventors: Theo P. Schaad, Seattle, WA (US); Jerome M. Paros, Kirkland, WA (US)

(73) Assignee: Quartz Sensors, Inc., Redmond, WA (US)

(*) Notice: Subject to any disclaimer, the term of this patent is extended or adjusted under 35 U.S.C. 154(b) by 0 days.

(21) Appl. No.: 10/214,920

(22) Filed: Aug. 7, 2002

(65) Prior Publication Data

US 2004/0025590 A1 Feb. 12, 2004

(51) Int. Cl.[7] .............................................. G01P 15/10
(52) U.S. Cl. ..................................... 73/514.29; 73/510
(58) Field of Search ........................ 73/514.29, 514.33, 73/514.36, 514.38, 514.21, 514.24, 510

(56) References Cited

U.S. PATENT DOCUMENTS

| | | | |
|---|---|---|---|
| 2,854,581 A | 9/1958 | Scarrott | 250/36 |
| 2,984,111 A | 5/1961 | Kritz | 73/517 |
| 3,002,391 A | 10/1961 | Holmes | 73/517 |
| 3,057,208 A | 10/1962 | Bedford | 73/517 |
| 3,148,289 A | 9/1964 | Pijls et al. | 310/8.1 |
| 3,190,129 A | 6/1965 | Kritz et al. | 73/517 |
| 3,238,789 A | 3/1966 | Erdley | 73/517 |
| 3,382,724 A | 5/1968 | Wilcox | 73/517 |
| 3,440,888 A | 4/1969 | Southworth, Jr. et al. | 73/517 |
| 3,465,597 A | 9/1969 | Riordan et al. | 73/517 |
| 3,470,400 A | 9/1969 | Weisbord | 310/15 |
| 3,479,536 A | 11/1969 | Norris | 310/8.5 |
| 4,091,679 A | 5/1978 | Furusawa et al. | 73/497 |
| 4,215,570 A | 8/1980 | Eer Nisse | 73/141 R |
| 4,372,173 A | 2/1983 | Eer Nisse et al. | 73/862.59 |
| 4,398,417 A * | 8/1983 | Shutt | 73/514.38 |
| 4,415,827 A | 11/1983 | Chuang | 310/370 |
| 4,445,065 A | 4/1984 | Albert | 310/321 |
| 4,467,651 A | 8/1984 | Peters et al. | 73/497 |
| 4,469,979 A | 9/1984 | Chuang | 310/370 |
| 4,479,385 A | 10/1984 | Koehler | 73/517 R |
| 4,531,073 A | 7/1985 | Eer Nisse | 310/370 |
| 4,656,383 A | 4/1987 | Albert | 310/321 |
| 4,658,174 A | 4/1987 | Albert | 310/323 |
| 4,658,175 A | 4/1987 | Albert | 310/323 |
| 4,743,790 A | 5/1988 | Albert | 310/321 |
| 4,757,228 A | 7/1988 | Kalinoski et al. | 310/316 |
| 4,912,990 A | 4/1990 | Norling | 73/862.59 |
| 4,980,598 A | 12/1990 | Albert | 310/321 |
| 5,109,175 A | 4/1992 | Albert | 310/321 |
| 5,170,665 A | 12/1992 | Janiaud et al. | 73/517 AV |
| 5,334,901 A | 8/1994 | Albert et al. | 310/321 |
| 5,596,145 A | 1/1997 | Albert et al. | 73/514.29 |

OTHER PUBLICATIONS

Hibbeler, Russell C., "*Analysis of Statically Determinate Structures*", Structures Analysis, Prentice–Hill 1999, Fourth Edition, Chapter 2, pp. 38–39.
Merhav, Shmuel, *Aerospace Sensor Systems and Applications*, Springer–Verlag 1996, pp. 165.
Best, *Phase–Locked Loops*, 4th Edition, Chap. 14, McGraw–Hill (1995).
Merhav, Shmuel, *Aerospace Sensor Systems and Applications*, Springer–Verlage, 1996, pp. 165.

* cited by examiner

Primary Examiner—John E. Chapman
(74) Attorney, Agent, or Firm—Dorsey & Whitney, LLP

(57) ABSTRACT

A triaxial acceleration sensor comprises an inertial mass suspended in three orthogonal directions by support members in a statically determinate structure. Acceleration applied to the inertial mass generates loading forces that stress the support members either in tension or in compression. The stress levels are thus a measure of the applied acceleration. In an embodiment of this invention, the support members are force-sensitive resonators whose resonant frequencies of oscillation are related to the stresses in the members. The resonant frequencies are thus a measure of the complete three-dimensional vector of the applied acceleration.

45 Claims, 10 Drawing Sheets

TRIAXIAL ACCELERATION SENSOR

TECHNICAL FIELD

The invention relates to an improved triaxial acceleration sensor using force-sensitive resonators or strain gauges.

BACKGROUND OF THE INVENTION

A number of force-sensitive resonators are described in the prior art. Single vibrating beam force sensors are described in U.S. Pat. Nos. 3,470,400, 3,479,536, 4,445,065, 4,656,383, 4,658,174, 4,658,175, 4,743,790, 4,980,598, 5,109,175, and 5,596,145. Double vibrating beam force sensors referred to as Double-Ended Tuning Forks (DETF) are described in U.S. Pat. Nos. 2,854,581, 3,148,289, 3,238,789, 4,215,570, 4,372,173, 4,415,827, 4,469,979, 4,531,073, 4,757,228, and 4,912,990. The change in frequency of oscillation of the resonant force sensors is a measure of the applied force.

There has been considerable effort in the prior art to apply resonator technology to acceleration measurements. Since acceleration is a three-dimensional vector, there are potential technical and cost benefits to develop an inherent triaxial sensor instead of a system using three single-axis devices. Previous efforts to make an inherent triaxial acceleration sensor encountered difficulties with suspending an inertial mass from tension-compression members. If the mass is held from both sides, in a push-pull arrangement, as shown in Aerospace Sensor Systems and Applications by Shinuel Merhav (Springer 1996, p. 165), the device becomes temperature-sensitive since thermal expansion or contraction acts on the opposing members. Furthermore, it is difficult to hang a mass with tension-compression members from three sides in a stable structure without using suspension systems or flexures. These suspensions constrain the forces generated by acceleration to one or two axes, prevent the simultaneous measurement of the full acceleration vector, and degrade performance.

Single-axis accelerometers employing resonator beams are disclosed in U.S. Pat. Nos. 2,984,111, 3,190,129, 3,238,789, 3,440,888, 3,465,597, 4,091,679, 4,479,385, 4,980,598, 5,109,175, 5,170,665, 5,334,901, and 5,596,145. In general, these devices are open-loop sensors without servo feedback, consisting of an inertial mass that exerts a force on the resonator under acceleration along the sensitive axis. The inertial mass is usually guided by a suspension system or flexures. Since a portion of the acceleration-induced load is shared with the suspension system or flexures, performance is degraded. In U.S. Pat. No. 4,479,385 by Koehler, the inertial mass is suspended by two resonators without additional flexures. This device is statically quasi-stable, tends to deflect in the direction of acceleration, and is prone to low-frequency oscillations in the sensitive axis. These and other shortcomings are greatly improved upon with the present invention.

In the prior art, multi-axis accelerometers have been proposed to measure acceleration along any axis. Prior art triaxial accelerometers have not been successful in meeting the high performance of single-axis accelerometers. One type of triaxial accelerometers consists of coaxial tension-compression pairs of vibrating strings that hold a central inertial mass in three orthogonal directions, as disclosed in U.S. Pat. Nos. 3,002,391, 3,057,208, and 3,382,724. The strings must be pre-tensioned to sustain compressive loads and suffer from long-term drift as the strings relax and creep with time. These accelerometers are not statically determinate and are susceptible to moments and applied linear and torsional vibrations. The tension-compression, push-pull arrangement also makes the prior art devices temperature sensitive as thermal expansion generates forces on the strings.

Erdley discloses two types of three-axis accelerometers utilizing force-sensitive resonators in U.S. Pat. No. 3,238,789. One type consists of a central mass suspended in three directions by dual-beam resonators. This device can only function accurately in an environment that is completely free of external moments. It is not a statically determinate structure and is prone to torsional oscillations about each of its axes, leading to performance degradation and breakage. The other prior art device consists of three pairs of coaxial resonators, similar to the triaxial vibrating string devices. This device is sensitive to temperature because thermal expansion and contraction exert unwanted tensile and compressive forces on the resonators. Again, the device is not statically determinate and moments tend to excite low-frequency torsional vibrations leading to breakage or performance degradation.

The invention described here combines for the first time the advantages of open-loop sensor technology in a structural arrangement that is in static equilibrium, statically determinate, temperature insensitive, and inherently triaxial.

SUMMARY OF THE INVENTION

A sensor is disclosed for providing a measure of linear acceleration in three orthogonal directions. The sensor includes a single inertial mass that is suspended in three orthogonal directions by support members in a statically determinate structure. The support members are strain gauges or force-sensitive resonators whose frequencies of oscillation vary with load. These tension-compression members are arranged in a statically determinate way such that they counteract three linear forces and three moments generated by linear and angular acceleration applied to the inertial mass. Six support members may be used as six constraints, arranged in three pairs, one pair for each orthogonal direction, in triaxial symmetry. In one embodiment of this invention, the two support members in each direction are spaced apart and loaded equally, with the sum of the outputs being a measure of linear acceleration to the inertial mass. The set of signal outputs contains the complete information of all linear forces generated by acceleration acting on the inertial mass. It can easily be corrected for geometric alignment and is thus a highly accurate measure of acceleration in three-dimensional inertial space.

BRIEF DESCRIPTION OF THE DRAWINGS

In FIG. 8A, the tension-compression members are independent single-beam resonators or double-ended tuning forks. In FIG. 8B, the members are single vibrating beams that are oscillating in 180 degrees opposition.

DETAILED DESCRIPTION OF THE INVENTION

The invention disclosed here shows for the first time how a single inertial mass can be suspended in three axes by force-sensitive resonators or strain gauges in a statically determinate structure to produce an accurate triaxial accelerometer design.

Static equilibrium is described in Structural Analysis by R. C. Hibbeler (Prentice-Hill 1999, 4th edition). A three-dimensional structure is in static equilibrium when it maintains a balance of three forces and three moments.

Figure 1:
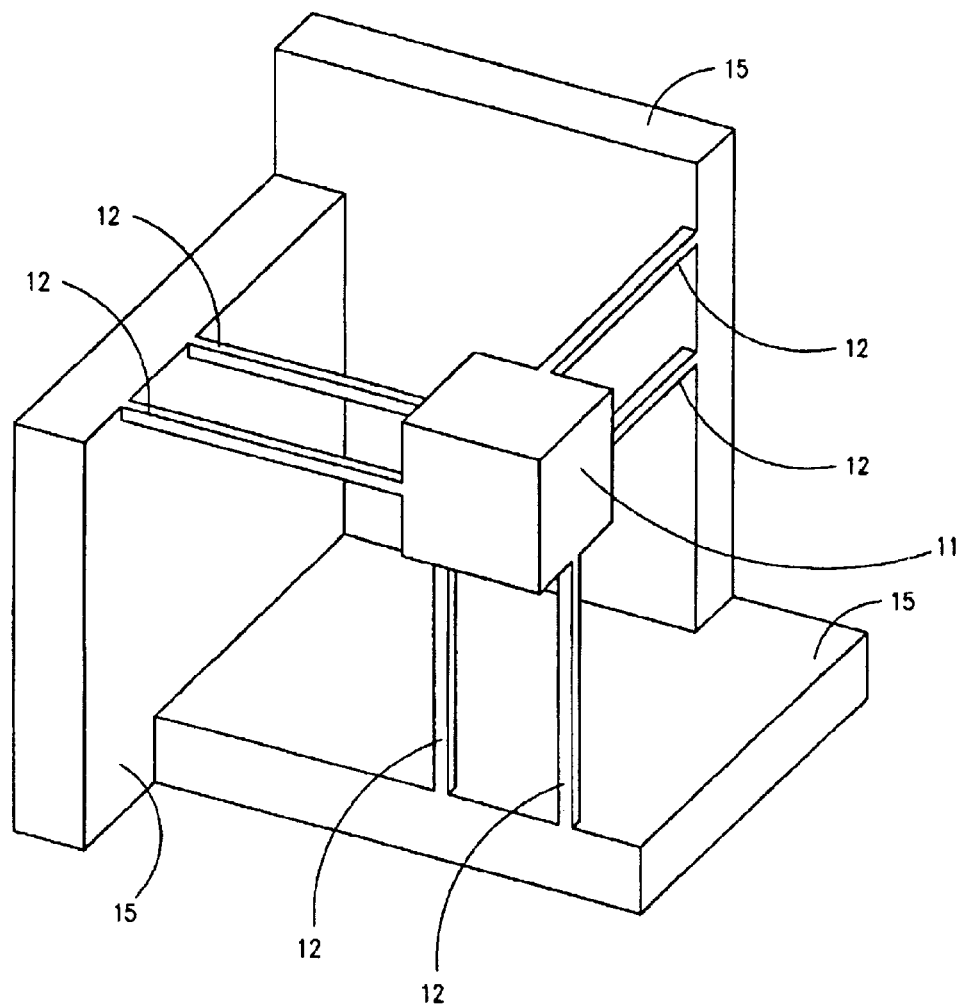
FIG. 1 is an isometric view of a triaxial acceleration sensor according to one embodiment of the invention consisting of an inertial mass suspended in three directions by tension-compression members in a statically determinate structure.

The invention as disclosed in FIG. 1 shows how six support members can be arranged in structural triaxial symmetry to constrain static equilibrium in a statically determinate structure. An inertial mass 11 is suspended in three orthogonal directions from six support members 12 that are attached to, or integral with, a base 15. The principle of static determinacy is readily demonstrated. For example, the removal of any one of the members 12 would make the structure unstable if moments are applied to the central mass.

The accelerometer shown in FIG. 1 exhibits structural triaxial or three-axis symmetry. It is constructed in such a way that an interchange of axes, sometimes described as an Euler rotation, produces no significant change in outputs or operation. The triaxial accelerometer essentially looks the same as viewed from any of the three Cartesian coordinate axes. The orientation of the spacing of each pair of parallel support members in FIG. 1 is also symmetric under an interchange of axes. For instance, if the members in the x-direction are spaced apart in the y-direction, then the y-members are spaced in the z-direction, and the z-members in the x-direction. The structural triaxial symmetry does not apply to the scaling or the spacing of the support members, as long as the requirements of static determinacy are fulfilled as described herein.

The support members 12 suspend the inertial mass in cantilever fashion from a base or frame 15. The mass is not supported from the directly opposite side in a push-pull arrangement that would be sensitive to the thermal expansion and contraction of the entire structure. If the frame and the inertial mass are constructed from different materials than the support members and do not expand at exactly the same thermal expansion rate, then, in a suspended push-pull arrangement, one of the members exerts thermal stresses on the opposing members and causes high temperature sensitivity. In this invention, however, the inertial mass is suspended in each direction from only one side, and expansion of the structural members do not create thermally reactive forces and stresses. As long as the other support members that hold the mass in orthogonal directions are compliant in their transverse directions, the structural temperature sensitivity can be made very small. Acceleration applied to the inertial mass 11 produces tension or compression in the support members 12 whose change in stress is a measure of the applied acceleration.

Figure 2:
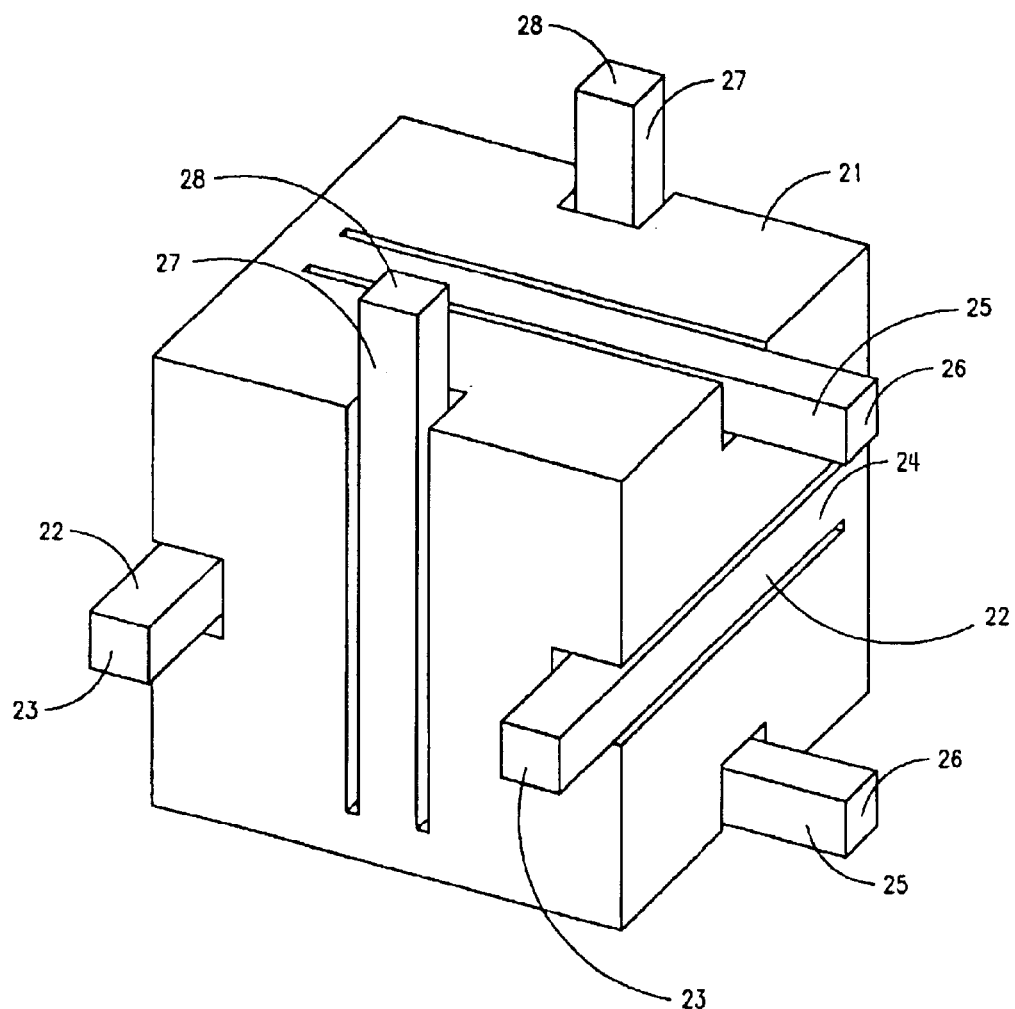
FIG. 2 is an isometric view of a compact triaxial acceleration sensor according to another embodiment of the invention consisting of an inertial mass suspended in three directions by tension-compression members in a statically determinate structure. The support members are attached to, or integral with, a base (not shown).

FIG. 2 is a compact variation of the triaxial acceleration sensor shown in FIG. 1. The inertial mass 21 is suspended by three pairs of support members 22, 25, 27, that are integral with or attached at points 23, 26, 28 to a base or frame (not shown). With this arrangement, the inertial mass can take up much of the internal volume of the acceleration sensor and it can be maximized to produce more loading forces in the support members under applied acceleration. This arrangement is also conducive to producing an integral monolithic structure that eliminates attachment points.

Figure 3A:
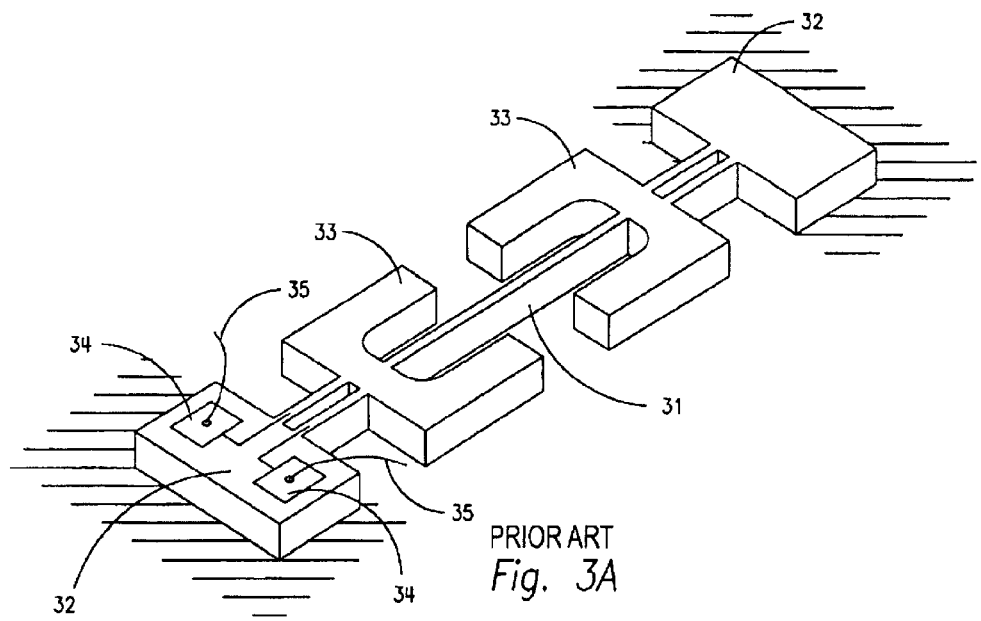
FIG. 3A is an isometric view of a conventional single-beam force-sensitive resonator.
Figure 3B:
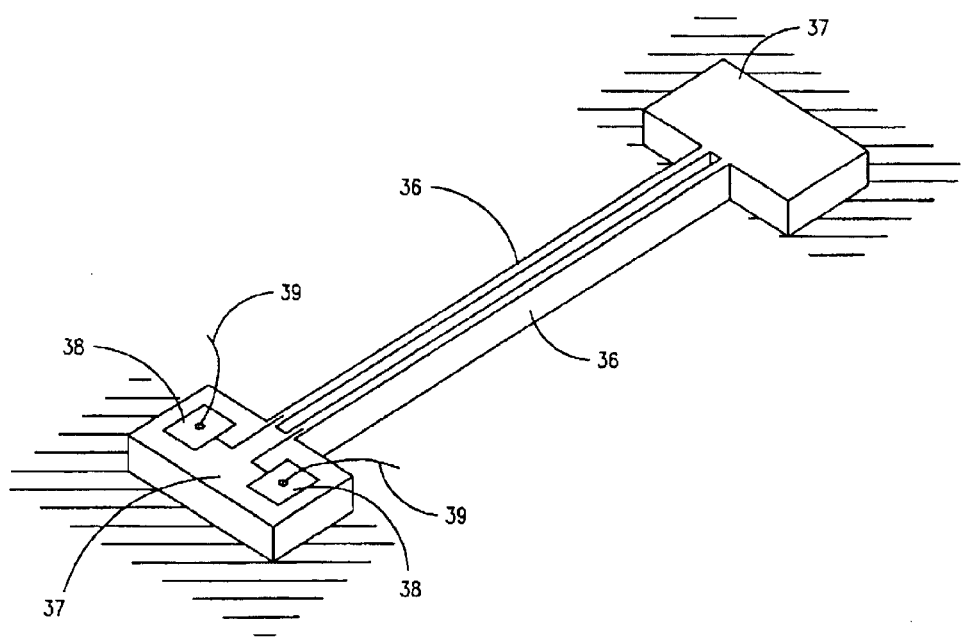
FIG. 3B is an isometric view of a conventional dual-beam force-sensitive resonator.

Prior-art bulk resonators that are of single-beam or dual-beam design are shown in FIG. 3. In FIG. 3A, the single-beam, force-sensitive resonator consists of a single beam 31 suspended from two mounting pads 32. Optionally, low-pass mechanical filters 33 balance the reactive forces and moments of the vibrating beam. Electrical leads 35 from an oscillator (not shown) are attached to traces 34 to excite the beam into transverse oscillation by piezoelectric or other electric means. In FIG. 3B, the dual-beam, double-ended tuning fork (DETF) consists of two beams 36 suspended between two mounting pads 37 and vibrating in 180 degrees phase opposition. The transverse forces and moments of the beams 36 are largely cancelled in this arrangement. Electrical leads 39 from an oscillator (not shown) are attached to traces 38 on the resonators to excite mechanical tine motion by piezoelectric or other electric means.

One or more of the force-sensitive resonators shown in FIGS. 3A and 3B may be used as support members 12 (FIG.

1), 22 (FIG. 2) to support the inertial mass 11, 21 and to measure the acceleration-induced stresses in the support members 12, 22. Of course, other stress-measuring sensors, such as strain gauges can also be used to measure the acceleration-induced strain in the support members 12, 22. Alternatively, the support members may comprise resilient beams with force-sensitive resonators shown in FIGS. 3A and 3B attached to each support member to measure the acceleration-induced stresses.

Figure 4A:
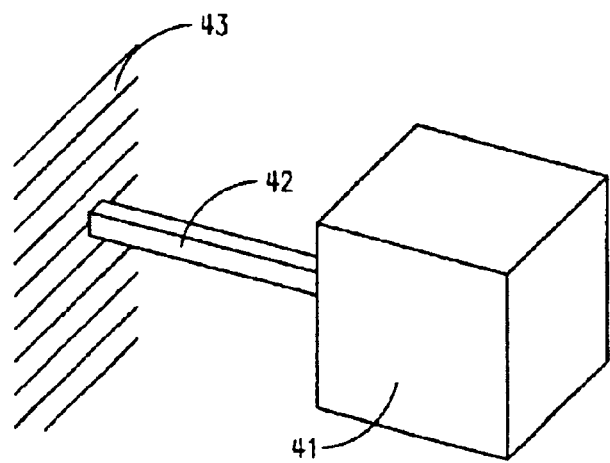
FIGS. 4A and 4B are schematic diagrams of a tension-compression member attached to an inertial mass that exerts a force on the member under acceleration. The tension-compression members ideally only exert normal reactive forces, N, but only weakly support shear forces, S, or moments, M. Therefore, the structure is not stable under transverse force, F.
Figure 4B:
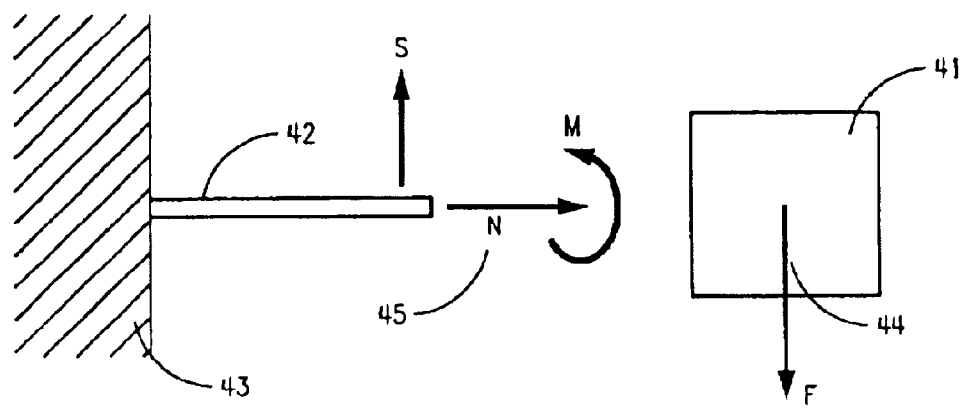

FIG. 4A shows a mass 41 suspended in cantilever fashion from base 43 with support member 42. FIG. 4B shows the stresses in the support member 42 when acceleration is applied to the inertial mass 41. The force, F, 44 is counteracted by reactive normal forces, N, shear forces, S, and moments, M, in the support member. The support member is designed to be stiff in the longitudinal direction, but is compliant in the transverse directions so that it can bend readily. It strongly supports tensile and compressive forces, but only weakly supports shear forces and moments. The acceleration-induced force 44 cannot be counteracted by the normal force, N, 45, alone, and the arrangement is not stable as shown and is not statically determinate.

Figure 5A:
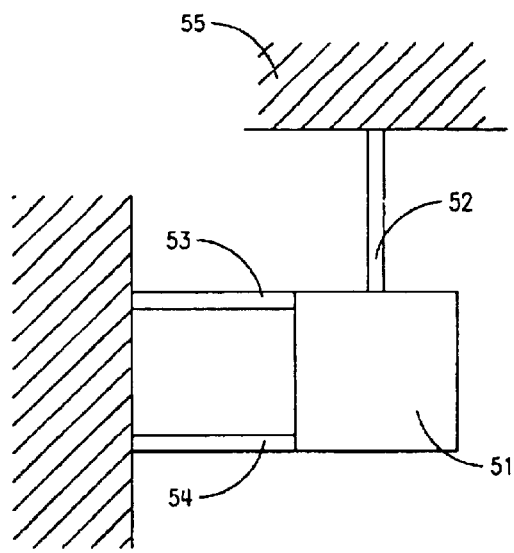
FIGS. 5A and 5B are schematic diagrams of a statically determinate structure shown in two dimensions. In general, the supporting members counteract two linear force components, shown as Fx and Fy in the respective directions, and a torsional moment, Mz, about the third axis. Ideal tension-compression members can only support normal loads in the coaxial direction, and three members are needed to constrain all of the acceleration-induced forces and moments in two dimensions. Six members are needed in three dimensions.
Figure 5B:
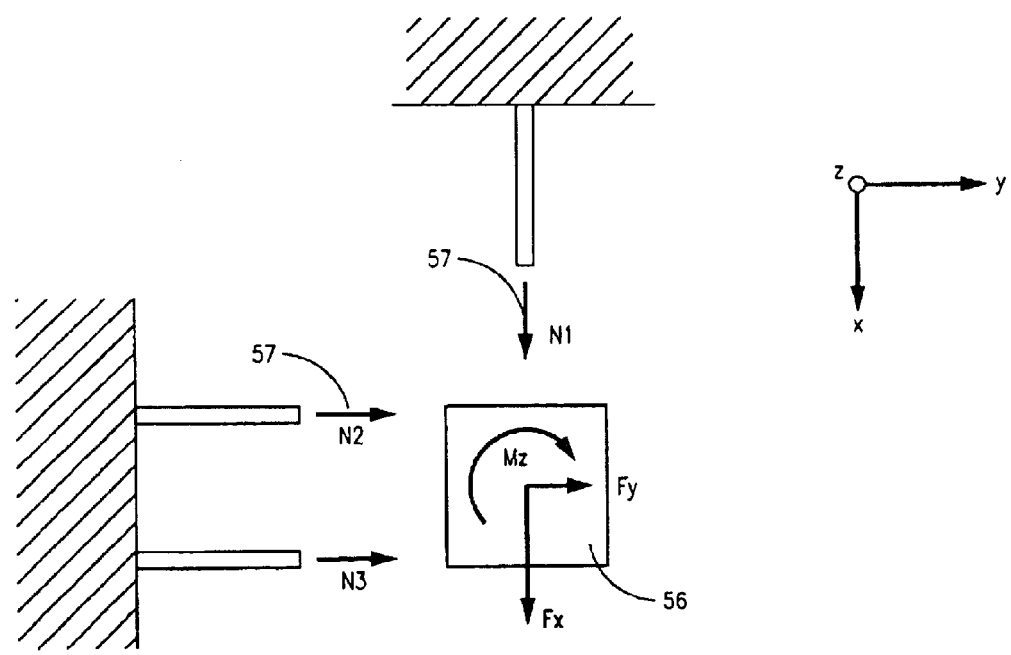

A statically determinate configuration is demonstrated in FIG. 5A in a two-dimensional representation. An inertial mass 51 is suspended in the x-y plane from three tension-compression members 52, 53, 54 in two directions from a base 55. FIG. 5B shows a schematic diagram of the structural forces and moments. Acceleration applied to the inertial mass 51 produces two forces Fx and Fy and a moment Mz in the x-y plane about the third z axis. The support members are designed to be stiff in the longitudinal direction, but are compliant in the transverse directions. Each member can only counteract normal forces, and three support members are necessary and sufficient to constrain the two forces Fx and Fy, and moment Mz with normal forces N1, N2, N3.

Figure 6A:
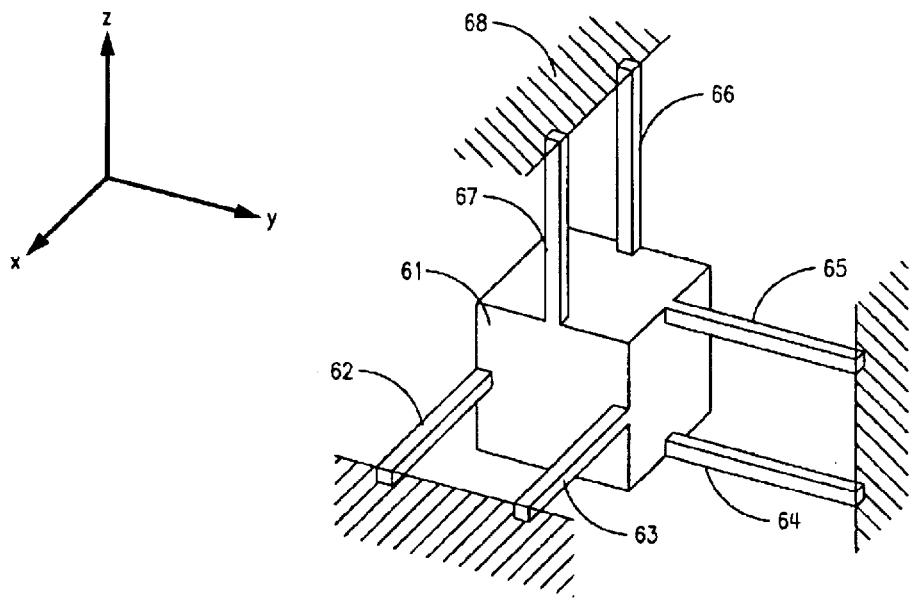
FIGS. 6A and 6B are isometric and elevational views, respectively, showing a simplified view of the triaxial accelerometer of FIG. 1 in three dimensions, and a projection into two dimensions. Six tension-compression members are needed to counteract the three acceleration-induced forces and three moments in a statically determinate way.

The principle of static determinacy is readily applied to the three-dimensional case. In FIG. 6A, acceleration applied to the inertial mass 61 generates three linear force components and three moments about three orthogonal axes. Each tension-compression member only constrains one of the static equilibrium conditions. Thus, six support members are both necessary and sufficient for static equilibrium. The structure shown in FIG. 6A is statically determinate. Additional support members would render the structure indeterminate.

Figure 6B:
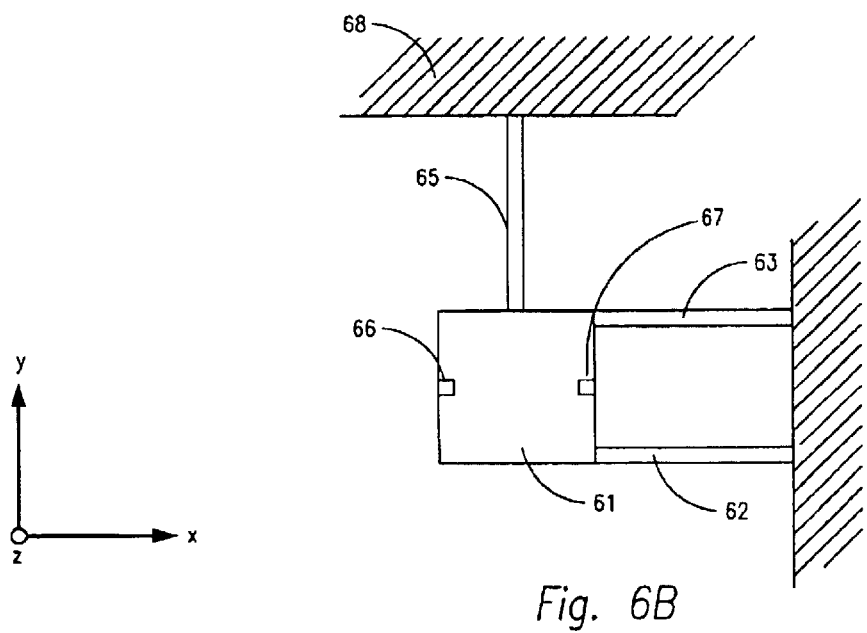

FIG. 6B shows a projection onto the x-y plane, it being understood, that structural triaxial symmetry applies to the entire device. The three pairs of support members 62 and 63, 64 and 65, 66 and 67, are spaced apart equally from parallel lines leading to the center-of-mass of the inertial mass 61. Acceleration along the x-axis produces a shared load in the two x-members 62 and 63. With perfect alignment, the two loads are exactly equal. If, however, the center-of-mass is slightly to one side of the two members, or if moments are generated, the load is shared unequally. The sum of the loads remains constant, and it follows that while each support member produces a measure of acceleration along one axis, the summed output of each pair is independent of cross-axis misalignments of the centroid or angular accelerations.

In all these examples, the tensile and compressive stresses in the support members are a measure of the applied acceleration. Measurement of the stresses can be accomplished with strain gauges or force-sensitive resonators. An advantage in sharing the load between the support members when they are resonator pairs is that the frequency outputs track each other and that generally, the frequencies will not be the same within the acceleration range of the device. Thus there is no coupling, lock-in, or interference between the natural resonances of the two support members. The foregoing can be applied in general to the entire structure. Three pairs of frequency ranges can be chosen, such that they do not overlap within the operational range of the device.

A wide range of full-scale accelerations can be configured by designing the stress sensitivity of the support members and choosing the value of the inertial mass, m, 61. It is desirable to have a high resonant frequency of the entire structure for immunity from external vibrations and to optimize the mechanical response bandwidth. Thus it is desirable to design the support members to be stiff in the longitudinal direction with equivalent spring rate k, such that the structural resonant frequency, $f=(½\pi)\sqrt{(k/m)}$, is high.

Figure 7A:
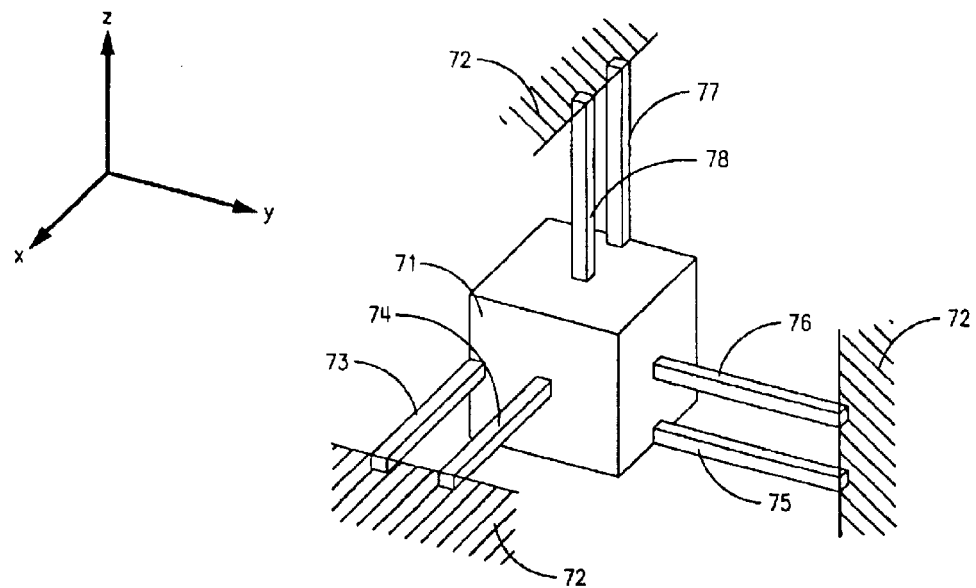
FIGS. 7A and 7B are isometric and elevational views, respectively, showing a variation of FIGS. 6A and 6B, with one member of each pair of support members aligned with the centroid (center-of-mass) of the inertial mass, and the other spaced apart.
Figure 7B:
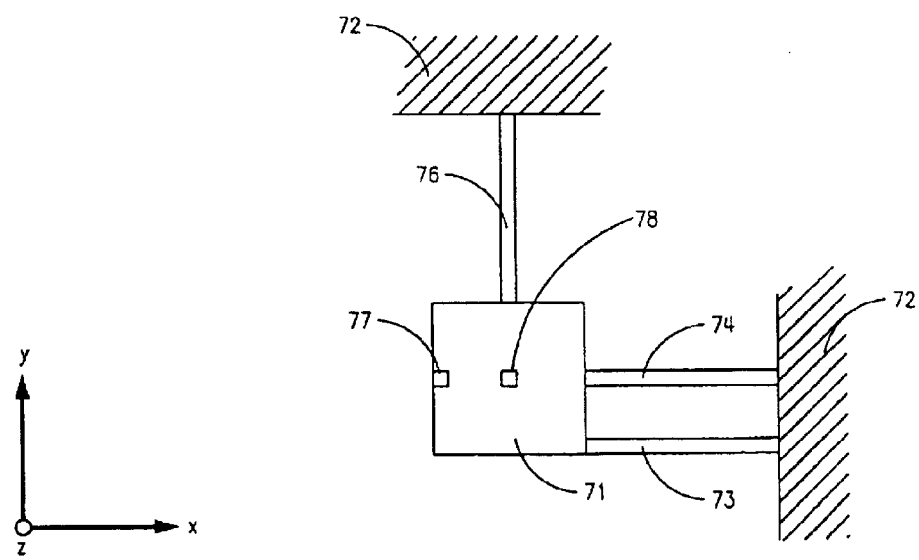

Referring now to FIG. 7, a variation of the design is shown wherein one of the support members 74, 76, 78 on each of the three sides is considered primary and is aligned with the centroid of the inertial mass 71 and fixed base 72. The other secondary member 73, 75, 77 of each pair is spaced apart as before. In this arrangement, essentially all linear acceleration-induced loads are carried by the three primary members. The outputs of the secondary members can optionally be used as small corrections to the output signal. The advantage of this arrangement is that the sensitivity range of the primary members is increased and that the number of output channels can be reduced to three if the small corrections of the secondary members are not used.

Figure 8A:
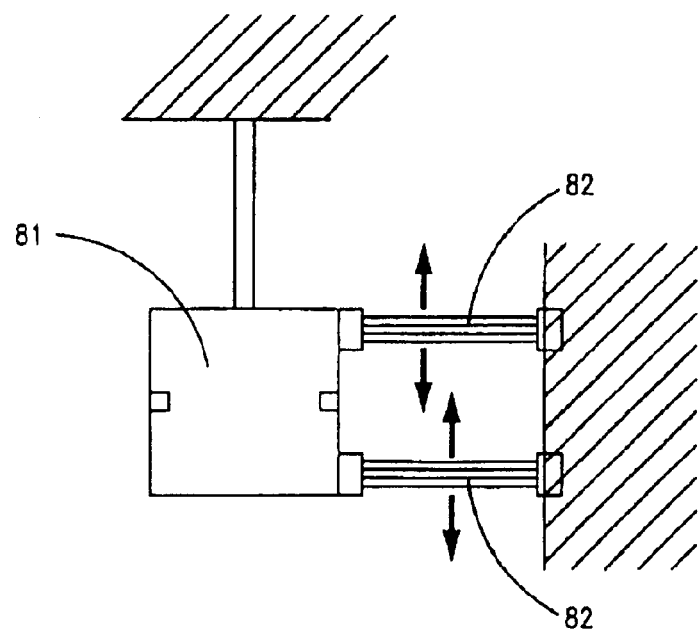
FIGS. 8A and 8B show schematic projections of the triaxial accelerometer according to another embodiment of the invention in one of the principal planes.
Figure 8B:
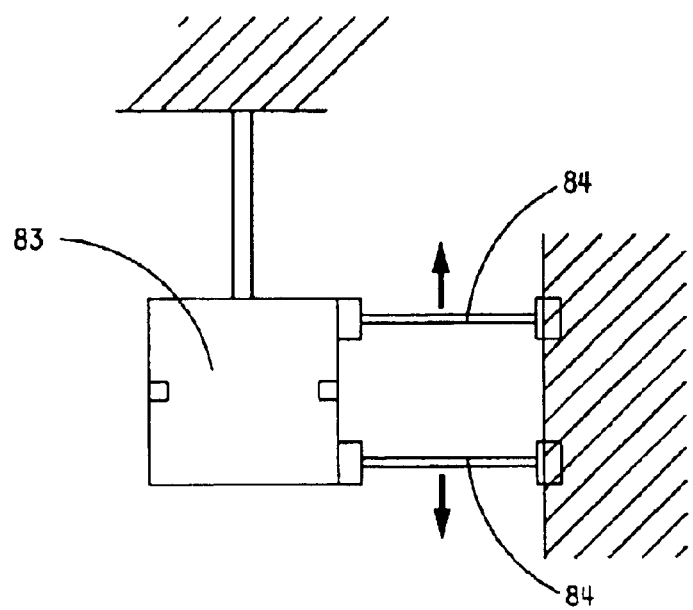

Until now, the outputs of the load-carrying members have been considered independent measures of the load carried by them. Generally, each member can be instrumented as a single-beam or dual-beam resonator, or as a strain gauge measuring longitudinal stresses. FIG. 8A is an illustration of such a device where independent DETF force-sensitive resonators 82 are connected to the inertial mass 81. As before, triaxial symmetry applies. In FIG. 8B, the inertial mass 83 is supported in the three axes by three pairs of resonators wherein each pair of resonators are spaced-apart single beams 84, driven electrically in 180 degrees opposition. The advantages are that for each pair, there is only one electrical frequency output, simplifying the triaxial outputs to three frequency outputs that carry the acceleration information. In this embodiment, small moments between the members of each pair will produce small changes in the natural frequencies of each beam, but since the changes are essentially equal and opposite, and since the beams are driven jointly in 180 degrees opposition, the driven frequency represents the average of the applied acceleration component.

Figure 9:
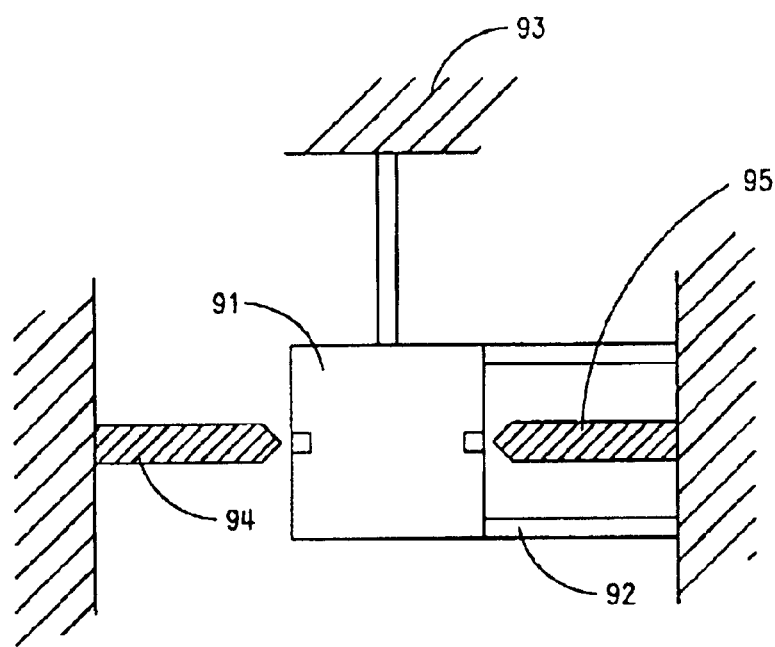
FIG. 9 is a projection of a triaxial accelerometer according to still another embodiment of the invention in one of the principal planes with limit stops that provide overload protection.

In the operation of acceleration sensors, it is sometimes desirable to withstand acceleration far exceeding the measured range. The support members can only withstand stresses within their tensile and buckling limits. The members undergo small longitudinal deflections under applied load, which can be limited with stops 94, 95 as shown in FIG. 9. In this schematic view, stops are shown only along one of the three directions, but structural triaxial symmetry is understood. The stops 94, 95 are designed to stop each member within their tensile and compressive or buckling limits. The stops can be positioned while the inertial mass is pre-loaded to the maximum limits. Dynamic stops using micro-motion piezoelectric or magnetostrictive activators are also possible. Such stops can be deployed in one of two ways. They can be activated at the onset of overload conditions and positioned to immobilize the inertial mass.

Alternatively, they can be positioned in contact with the inertial mass while in the expanded active stage with no load applied to the inertial mass and then retracted such that the gap accommodates loads only to the maximum limit.

Figure 10A:
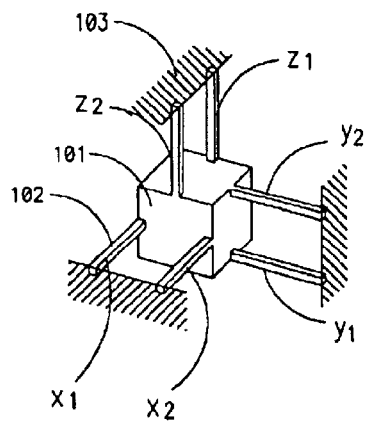
FIG. 10A shows a triaxial acceleration sensor with six frequency outputs.

FIG. 10A shows a triaxial accelerometer comprising an inertial mass 101 which is suspended from a base 103 by three pairs of force-sensitive resonators 102 in three orthogonal directions, x, y, and z. The frequency of oscillation of the resonators is a measure of the stresses induced by acceleration applied to the inertial mass 101.

Figure 10B:
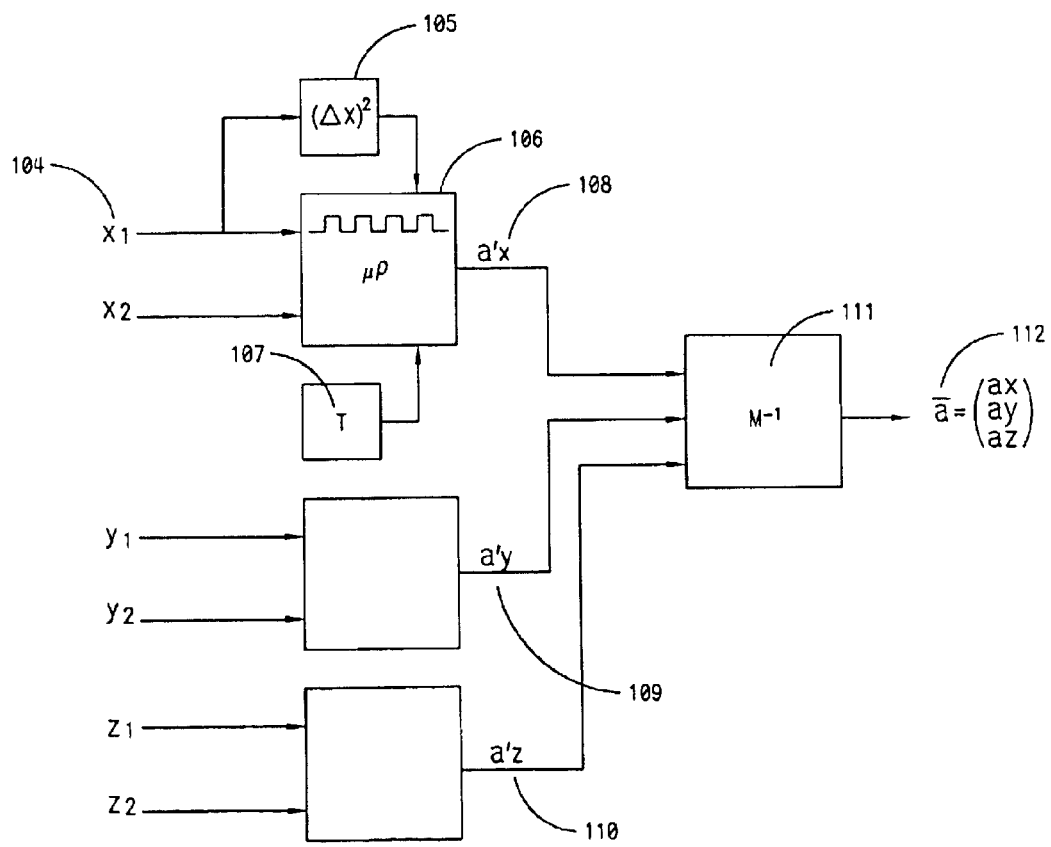
FIG. 10B is a schematic view of a method of determining the three-axis acceleration vector. For each axis, the frequency outputs of the two support members are counted, optionally corrected for temperature effects and vibration rectification, and converted into acceleration through a modeling equation or look-up table. The three combined outputs are further algebraically corrected for geometric alignment to produce a measure of the three acceleration components.

FIG. 10B shows the process of determining acceleration from the output frequency signals 104 of the six resonator support members 102, x1, x2, y1, y2, z1, and z2. The frequency is measured and the relationship to acceleration is calibrated using known acceleration inputs. The data may be fit to a modeling equation or used in a look-up table and modeled by a micro-processor 106. The outputs of each pair are weighted and summed to produce a digital output 108 of each acceleration component. Optionally, a temperature sensor output 107 may be used for compensation in a thermal correction model. If the force-sensitive resonator outputs are non-linear, then external vibrations can produce small measurement errors due to vibration rectification. Vibration sensors may be used as inputs 105 to the model to correct for these errors. Alternatively, the outputs of the triaxial accelerometer may be analyzed for frequency modulations above the sampling rate and below the resonant pole of the structure to provide correction inputs 105 for rectification errors.

The three outputs 108, 109, 110, which are digital measurements of acceleration along three orthogonal axes of the sensor, represent the applied acceleration if the sensor were constructed with perfect alignment along the Cartesian coordinates. The measured output vector a' tracks the applied acceleration vector a as a'=M a, where M is a three-by-three matrix. Ideally M is the identity matrix, but small misalignments between the true input axes and the sensor axes make the non-diagonal entries non-zero. The matrix M can be determined by calibration. It follows that the best measure of the input acceleration from measurements of the triaxial accelerometer outputs 112 is a=Inv(M) a', where Inv(M) is the inverse matrix calculated from the calibrated matrix M. The evaluation of Inv(M) 111 is readily accomplished by conventional algebraic techniques using microprocessors.

From the foregoing it will be appreciated that, although specific embodiments of the invention have been described herein for purposes of illustration, various modifications may be made without deviating from the spirit and scope of the invention. In particular, it is understood, that, although force-sensitive resonators were shown as support members, a triaxial acceleration sensor can be constructed in which the stresses in the support members are measured by alternative means, for instance, using conventional strain gauges. Accordingly, the invention is not limited except as by the appended claims.

What is claimed is:

1. A triaxial sensor that measures acceleration in three dimensions, comprising:
    an inertial mass;
    three pairs of support members attached to the inertial mass with each pair extending from the inertial mass in substantially parallel directions with respective axes that are mutually orthogonal to each other, the support members in each pair being spaced apart from each other to suspend the inertial mass in three substantially orthogonal directions and provide a statically determinate structure so that acceleration applied to the inertial mass generates tensile or compressive stresses in the support members; and
    stress sensors measuring the stresses in the support members.

2. The sensor of claim 1 wherein the support members are stiff in the longitudinal direction and compliant in their transverse directions.

3. The sensor of claim 1 wherein the plurality of support members are arranged in structural triaxial symmetry.

4. The sensor of claim 3 wherein the support members in at least one of the pairs of support members are spaced apart from a parallel line leading to the centroid of the inertial mass.

5. The sensor of claim 3 wherein at least one pair of the support members comprises a central member aligned with the centroid of the inertial mass.

6. The sensor of claim 1 wherein at least one of the support members comprises a force-sensitive resonator having an oscillation frequency that varies with the acceleration-induced stress in the force-sensitive resonator, and wherein the stress sensor comprises a sensor determining the resonant frequency of the force-sensitive resonator.

7. The sensor of claim 6 wherein the force-sensitive resonator comprises a force-sensitive single-beam resonator.

8. The sensor of claim 7 wherein the support members in at least one of the pairs comprise two force-sensitive single-beam resonators, and wherein the sensor device comprises a drive mechanism operable to drive the force-sensitive single-beam resonator out of phase in 180 degrees opposition.

9. The sensor of claim 6 wherein the force-sensitive resonator comprises a dual-beam double-ended tuning fork resonator.

10. The sensor of claim 6 wherein the frequencies of oscillation of the force-sensitive resonators do not coincide at any applied acceleration within the sensitive acceleration range of the sensor.

11. The sensor of claim 6 wherein the force-sensitive resonator comprises a piezoelectric crystalline quartz force-sensitive resonator.

12. The sensor of claim 6 wherein the force-sensitive resonator comprises a silicon force-sensitive resonator.

13. The sensor of claim 6, further comprising a vibration sensor operatively connected to the sensor and having an output that can be used to correct for vibration rectification errors.

14. The sensor of claim 6, further comprising an electronic system wherein the stress sensor outputs of the triaxial accelerometer are analyzed for frequency modulations above the sampling rate and below the resonant pole of the structure to correct for vibration rectification errors.

15. The sensor of claim 1 wherein each of the support members comprises a respective silicon support member.

16. The sensor of claim 1 wherein each of the support members comprises a resilient beam, and wherein the stress sensors comprise respective strain gauges attached to the resilient beams to measure the acceleration-induced stresses in the beams.

17. The sensor of claim 1, further comprising a plurality of limit stops which allow the inertial mass to move freely within the sensitive acceleration range of the sensor but preventing support members from being further stressed beyond the acceleration range.

18. The sensor of claim 1, further comprising a temperature sensor operatively associated with the inertial mass, the support members or the stress sensors, the temperature sensor having an output indicative of temperature that can be used to correct for thermally induced errors in the inertial mass, the support members or the stress sensors, respectively.

19. The sensor of claim 1 wherein each of the support members comprises a resilient beam, and wherein the stress sensors comprise respective force-sensitive resonators attached to the resilient beams to measure the acceleration-induced stresses in the beams.

20. An acceleration measuring system, comprising: a triaxial sensor that measures acceleration in three dimensions, comprising:
an inertial mass;
three pairs of support members attached to the inertial mass with each pair extending from the inertial mass in substantially parallel directions with respective axes that are mutually orthogonal to each other, the support members in each pair being spaced apart from each other to suspend the inertial mass in three substantially orthogonal directions and provide a statically determinate structure so that acceleration applied to the inertial mass generates tensile or compressive stresses in the support members; and
stress sensors measuring the stresses in the support members; and
an electronic system coupled to the stress sensors, the electronic system being operable to measure the acceleration applied to the internal mass based on outputs of the stress sensors.

21. The measurement system of claim 20 wherein the electronic system is further operable to linearize the output of the stress sensors.

22. The measurement system of claim 21 wherein the electronic system is operable to linearize the outputs of the stress sensors with a modeling equation.

23. The measurement system of claim 21 wherein the electronic system is operable to linearize the outputs of the stress sensors with a look-up table.

24. The measurement system of claim 20 wherein the electronic system is operable to produce outputs of three substantially orthogonal components of linear acceleration.

25. The measurement system of claim 24 wherein the electronic system is operable to correct the three outputs algebraically with an alignment matrix to determine three orthogonal components of acceleration applied to the inertial mass.

26. The measurement system of claim 20 wherein the support members are stiff in the longitudinal direction and compliant in their transverse directions.

27. The measurement system of claim 20 wherein the plurality of support members are arranged in structural triaxial symmetry.

28. The measurement system of claim 27 wherein the support members in at least one of the pairs of support members are spaced apart from a parallel line leading to the centroid of the inertial mass.

29. The measurement system of claim 27 wherein at least one pair of the support members comprises a central member aligned with the centroid of the inertial mass.

30. The measurement system of claim 20 wherein at least one of the support members comprises a force-sensitive resonator having an oscillation frequency that varies with the acceleration-induced stress in the force-sensitive resonator, and wherein the stress sensor comprises a sensor determining the resonant frequency of the force-sensitive resonator.

31. The measurement system of claim 30 wherein the force-sensitive resonator comprises a force-sensitive single-beam resonator.

32. The measurement system of claim 30 wherein the support members in at least one of the pairs comprise two single vibrating beams and wherein the sensor device comprises a drive mechanism operable to drive the beams out of phase in 180 degrees opposition.

33. The measurement system of claim 30 wherein the force-sensitive resonator comprises a dual-beam double-ended tuning fork resonator.

34. The measurement system of claim 30 wherein the frequencies of oscillation of the force-sensitive resonators do not coincide at any applied acceleration within the sensitive acceleration range of the sensor.

35. The measurement system of claim 30 wherein the force-sensitive resonator comprises a piezoelectric crystalline quartz force-sensitive resonator.

36. The measurement system of claim 30 wherein the force-sensitive resonator comprises a silicon force-sensitive resonator.

37. The measurement system of claim 30, further comprising a vibration sensor operatively connected to the sensor and having an output that can be used to correct for vibration rectification errors.

38. The measurement system of claim 30, further comprising an electronic system wherein the stress sensor outputs of the triaxial accelerometer are analyzed for frequency modulations above the sampling rate and below the resonant pole of the structure to correct for vibration rectification errors.

39. The measurement system of claim 20 wherein each of the support members comprises a respective silicon support member.

40. The measurement system of claim 20 wherein each of the support members comprises a resilient beam, and wherein the stress sensors comprise respective strain gauges attached to the resilient beams to measure the acceleration-induced stresses in the beams.

41. The measurement system of claim 20, further comprising a plurality of limit stops which allow the inertial mass to move freely within the sensitive acceleration range of the sensor but preventing support members from being further stressed beyond the acceleration range.

42. The measurement system of claim 20, further comprising a temperature sensor operatively associated with the triaxial sensor, the temperature sensor having an output indicative of temperature that can be used to correct for thermally induced errors in the triaxial sensor.

43. The measurement system of claim 20 wherein each of the support members comprises a resilient beam, and wherein the stress sensors comprise respective force-sensitive resonators attached to the resilient beams to measure the acceleration-induced stresses in the beams.

44. The sensor of claim 1 wherein the support members in each pair extend from the inertial mass in the same direction.

45. The measurement system of claim 20 wherein the support members in each pair extend from the inertial mass in the same direction.

* * * * *

UNITED STATES PATENT AND TRADEMARK OFFICE
CERTIFICATE OF CORRECTION

PATENT NO. : 6,826,960 B2
APPLICATION NO. : 10/214920
DATED : December 7, 2004
INVENTOR(S) : Theo P. Schaad and Jerome M. Paros It is certified that error appears in the above-identified patent and that said Letters Patent is hereby corrected as shown below:

| Column, Line | Reads | Should Read |
|---|---|---|
| On Title page Item (56), References Cited, Other Publications | [Omitted reference] | --Harris, *Shock and Vibration Handbook*, $4^{th}$ Edition, Chap. 14, McGraw-Hill (1995).-- |
| On Title page Item (56), References Cited, Other Publications, Best Reference | "Best, *Phase-Locked Loops*, $4^{th}$ Edition, Chap. 14, McGraw-Hill (1995)." | --Best, *Phase-Locked Loops*, $4^{th}$ Edition, Chap. 1, McGraw-Hill (1999).-- |
| Column 1, Line 30 | "by Shinuel" | --by Shmuel-- |
| Column 1, Line 61 | "triaxial accelerometers" | --triaxial accelerometer-- |
| Column 5, Line 49 | "understood, that structural" | --understood that structural-- |
| Column 7, Lines 22-30 | "If the force-sensitive resonator outputs are non-linear, then external vibrations can produce small measurement errors due to vibration rectification. Vibration sensors may be used as inputs 105 to the model to correct for these errors. Alternatively, the outputs of the triaxial accelerometer may be analyzed for frequency modulations above the sampling rate and below the resonant pole of the structure to provide correction inputs 105 for rectification errors." | --If the force-sensitive resonator outputs are non-linear, they may be linearized by the microprocessor 106 through various means, such as by executing an equation that models the non-linearity or by referencing a look-up table that includes corrected output values for each of a large number of values for the force-sensitive resonator outputs, or the outputs of a pair of force-sensitive resonators, one resonator undergoing tension and one undergoing compression, may be subtracted as described by Kritz in U.S. Patent 2,984,111. |

UNITED STATES PATENT AND TRADEMARK OFFICE
CERTIFICATE OF CORRECTION

| | | |
|---|---|---|
| PATENT NO. | : 6,826,960 B2 | |
| APPLICATION NO. | : 10/214920 | |
| DATED | : December 7, 2004 | |
| INVENTOR(S) | : Theo P. Schaad and Jerome M. Paros | |

It is certified that error appears in the above-identified patent and that said Letters Patent is hereby corrected as shown below:

Column 7, Lines 22-30 (cont'd)

If the force-sensitive resonator outputs are non-linear, then external vibrations can produce small measurement errors due to vibration rectification. An example of such non-linearities is described by Kritz in U.S. Patent 2,984,111, wherein the frequency of the resonator can be expressed as a series $f = f_0 + K_1 g + K_2 g^2 + \ldots$ Under external vibration, the acceleration imposed on the triaxial accelerometer is $g = g_0 + g_1 \sin(wt)$, wherein $g_0$ is the static acceleration or DC component and $g_1$ is the peak external vibration at radial frequency $w$, sometimes referred to as an AC component. The entire external vibration spectrum is a superposition of many single-vibration sources of this form. The resonator frequency is normally measured as an average. If the resonators were linear, the average of the sinusoidal AC component cancels out, but if there were higher-order non-linearities, the base frequency would shift.

UNITED STATES PATENT AND TRADEMARK OFFICE
CERTIFICATE OF CORRECTION

| | |
|---|---|
| PATENT NO. | : 6,826,960 B2 |
| APPLICATION NO. | : 10/214920 |
| DATED | : December 7, 2004 |
| INVENTOR(S) | : Theo P. Schaad and Jerome M. Paros |

It is certified that error appears in the above-identified patent and that said Letters Patent is hereby corrected as shown below:

Column 7, Lines 22-30 (cont'd)

In the example given, the average frequency is $<f> = f_0 + K_1 g_0 + K_2 g_0^2 + K_2 g_1^2$. The last term is referred to as the vibration rectification error. It is the intent of this invention to produce a highly accurate measurement of static acceleration even under the influence of external vibration. The vibration sensor 105 in FIG. 10B can be a conventional accelerometer whose analog voltage output is measured by an AC voltage meter to give a measure of the external vibration $g_1$, which is then used as a correction in the modeling equation. The vibration sensor 105 can also be the primary frequency output of the triaxial accelerometer, but must be sampled at a fast rate above the sampling rate used for averaging the static acceleration signal, and converted into a time-series of acceleration using, for example, phase-lock loop amplifiers or frequency-to-voltage converters.

UNITED STATES PATENT AND TRADEMARK OFFICE
CERTIFICATE OF CORRECTION

| | | |
|---|---|---|
| PATENT NO. | : 6,826,960 B2 | Page 4 of 6 |
| APPLICATION NO. | : 10/214920 | |
| DATED | : December 7, 2004 | |
| INVENTOR(S) | : Theo P. Schaad and Jerome M. Paros | |

It is certified that error appears in the above-identified patent and that said Letters Patent is hereby corrected as shown below:

Column 7, Lines 22-30 (cont'd)

The output is then analyzed for the AC component of external vibration, which is then used as a correction in the modeling equation. The fast sampling rate should be below the frequency of the resonant pole of the structure, as external vibration at structural resonances may lead to instabilities. Alternatively, the $g_1$ spectral density can be determined by Fast Fourier Transform (FFT) techniques from the time-series of acceleration. FFT spectrum analysis is described in Harris, Shock and Vibration Handbook, 4$^{th}$ Edition, Chap. 14, McGraw-Hill (1995). Phase-lock loop applications are described in Best, Phase-locked Loops, 4$^{th}$ Edition, McGraw-Hill (1999). Peters in U.S. Patent 4,467,651 also describes eliminating vibration rectification errors.

UNITED STATES PATENT AND TRADEMARK OFFICE
CERTIFICATE OF CORRECTION

PATENT NO.        : 6,826,960 B2
APPLICATION NO.   : 10/214920
DATED             : December 7, 2004
INVENTOR(S)       : Theo P. Schaad and Jerome M. Paros It is certified that error appears in the above-identified patent and that said Letters Patent is hereby corrected as shown below:

Column 7, Lines 22-30 (cont'd)

This technique of subtracting the outputs of a tension-compression, push-pull pair of resonators is further described by Kritz in U.S. Patent 2,984,111 wherein resonators are placed on opposite sides of a single inertial mass and by Norris in U.S. Patent 3,479,536 wherein the push-pull or tension-compression pair of resonators are situated in opposing directions on two separate inertial masses. In a preferred embodiment of this invention, the spaced-apart support members can be attached below or above the inertial mass to produce a tension-compression pair, with the subtracted difference in output signals being a measure of the applied static acceleration eliminating vibration rectification errors.--

| | | |
|---|---|---|
| Column 8, Line 30 | "single-beam resonator" | --single beam resonators-- |
| Column 9, Line 33 | "dual-beam double-ended tuning fork" | --dual beam, double-ended tuning fork-- |

UNITED STATES PATENT AND TRADEMARK OFFICE
CERTIFICATE OF CORRECTION

PATENT NO. : 6,826,960 B2
APPLICATION NO. : 10/214920
DATED : December 7, 2004
INVENTOR(S) : Theo P. Schaad and Jerome M. Paros It is certified that error appears in the above-identified patent and that said Letters Patent is hereby corrected as shown below:

| Column 10, Lines 7-11 | "32. The measurement system of claim 30 wherein the support members in at least one of the pairs comprise two single vibrating beams and wherein the sensor device comprises a drive mechanism operable to drive the beams out of phase in 180 degrees opposition." | --32. The measurement system of claim 30 wherein the support members in at least one of the pairs comprise two force sensitive single vibrating beams, and wherein the sensor device comprises a drive mechnaism operable to drive the beams out of phase in 180 degrees opposition.-- |

Signed and Sealed this

Twenty-third Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 6,826,960 B2
APPLICATION NO. : 10/214920
DATED : December 7, 2004
INVENTOR(S) : Theo P. Schaad and Jerome M. Paros It is certified that error appears in the above-identified patent and that said Letters Patent is hereby corrected as shown below:

| Column, Line | Reads | Should Read |
|---|---|---|
| On Title page Item (56), References Cited, Other Publications | [Omitted reference] | --Harris, *Shock and Vibration Handbook*, 4$^{th}$ Edition, Chap. 14, McGraw-Hill (1995).-- |
| On Title page Item (56), References Cited, Other Publications, Best Reference | "Best, *Phase-Locked Loops*, 4$^{th}$ Edition, Chap. 14, McGraw-Hill (1995)." | --Best, *Phase-Locked Loops*, 4$^{th}$ Edition, Chap. 1, McGraw-Hill (1999).-- |
| Column 1, Line 30 | "by Shinuel" | --by Shmuel-- |
| Column 1, Line 61 | "triaxial accelerometers" | --triaxial accelerometer-- |
| Column 5, Line 49 | "understood, that structural" | --understood that structural-- |
| Column 7, Lines 22-30 | "If the force-sensitive resonator outputs are non-linear, then external vibrations can produce small measurement errors due to vibration rectification. Vibration sensors may be used as inputs 105 to the model to correct for these errors. Alternatively, the outputs of the triaxial accelerometer may be analyzed for frequency modulations above the sampling rate and below the resonant pole of the structure to provide correction inputs 105 for rectification errors." | --If the force-sensitive resonator outputs are non-linear, they may be linearized by the microprocessor 106 through various means, such as by executing an equation that models the non-linearity or by referencing a look-up table that includes corrected output values for each of a large number of values for the force-sensitive resonator outputs, or the outputs of a pair of force-sensitive resonators, one resonator undergoing tension and one undergoing compression, may be subtracted as described by Kritz in U.S. Patent 2,984,111. |

UNITED STATES PATENT AND TRADEMARK OFFICE
CERTIFICATE OF CORRECTION

| | | |
|---|---|---|
| PATENT NO. | : 6,826,960 B2 | |
| APPLICATION NO. | : 10/214920 | |
| DATED | : December 7, 2004 | |
| INVENTOR(S) | : Theo P. Schaad and Jerome M. Paros | |

It is certified that error appears in the above-identified patent and that said Letters Patent is hereby corrected as shown below:

Column 7, Lines 22-30 (cont'd)

If the force-sensitive resonator outputs are non-linear, then external vibrations can produce small measurement errors due to vibration rectification. An example of such non-linearities is described by Kritz in U.S. Patent 2,984,111, wherein the frequency of the resonator can be expressed as a series $f = f_0 + K_1 g + K_2 g^2 + \ldots$ Under external vibration, the acceleration imposed on the triaxial accelerometer is $g = g_0 + g_1 \sin(wt)$, wherein $g_0$ is the static acceleration or DC component and $g_1$ is the peak external vibration at radial frequency w, sometimes referred to as an AC component. The entire external vibration spectrum is a superposition of many single-vibration sources of this form. The resonator frequency is normally measured as an average. If the resonators were linear, the average of the sinusoidal AC component cancels out, but if there were Higher-order non-linearities, the base frequency would shift.

UNITED STATES PATENT AND TRADEMARK OFFICE
CERTIFICATE OF CORRECTION

| | |
|---|---|
| PATENT NO. | : 6,826,960 B2 |
| APPLICATION NO. | : 10/214920 |
| DATED | : December 7, 2004 |
| INVENTOR(S) | : Theo P. Schaad and Jerome M. Paros |

It is certified that error appears in the above-identified patent and that said Letters Patent is hereby corrected as shown below:

Column 7, Lines 22-30 (cont'd)

In the example given, the average frequency is $<f> = f_0 + K_1 g_0 + K_2 g_0^2 + \frac{1}{2} K_2 g_1^2$. The last term is referred to as the vibration rectification error. It is the intent of this invention to produce a highly accurate measurement of static acceleration even under the influence of external vibration. The vibration sensor 105 in FIG. 10B can be a conventional accelerometer whose analog voltage output is measured by an AC voltage meter to give a measure of the external vibration $g_1$, which is then used as a correction in the modeling equation. The vibration sensor 105 can also be the primary frequency output of the triaxial accelerometer, but must be sampled at a fast rate above the sampling rate used for averaging the static acceleration signal, and converted into a time-series of acceleration using, for example, phase-lock loop amplifiers or frequency-to-voltage converters.

UNITED STATES PATENT AND TRADEMARK OFFICE
CERTIFICATE OF CORRECTION

| | | |
|---|---|---|
| PATENT NO. | : 6,826,960 B2 | |
| APPLICATION NO. | : 10/214920 | |
| DATED | : December 7, 2004 | |
| INVENTOR(S) | : Theo P. Schaad and Jerome M. Paros | |

It is certified that error appears in the above-identified patent and that said Letters Patent is hereby corrected as shown below:

Column 7, Lines 22-30 (cont'd)

The output is then analyzed for the AC component of external vibration, which is then used as a correction in the modeling equation. The fast sampling rate should be below the frequency of the resonant pole of the structure, as external vibration at structural resonances may lead to instabilities. Alternatively, the $g_1$ spectral density can be determined by Fast Fourier Transform (FFT) techniques from the time-series of acceleration. FFT spectrum analysis is described in Harris, Shock and Vibration Handbook, $4^{th}$ Edition, Chap. 14, McGraw-Hill (1995). Phase-lock loop applications are described in Best, Phase-locked Loops, $4^{th}$ Edition, McGraw-Hill (1999). Peters in U.S. Patent 4,467,651 also describes eliminating vibration rectification errors.

UNITED STATES PATENT AND TRADEMARK OFFICE
CERTIFICATE OF CORRECTION

| | |
|---|---|
| PATENT NO. | : 6,826,960 B2 |
| APPLICATION NO. | : 10/214920 |
| DATED | : December 7, 2004 |
| INVENTOR(S) | : Theo P. Schaad and Jerome M. Paros |

It is certified that error appears in the above-identified patent and that said Letters Patent is hereby corrected as shown below:

Column 7, Lines 22-30 (cont'd)

This technique of subtracting the outputs of a tension-compression, push-pull pair of resonators is further described by Kritz in U.S. Patent 2,984,111 wherein resonators are placed on opposite sides of a single inertial mass and by Norris in U.S. Patent 3,479,536 wherein the push-pull or tension-compression pair of resonators are situated in opposing directions on two separate inertial masses. In a preferred embodiment of this invention, the spaced-apart support members can be attached below or above the inertial mass to produce a tension-compression pair, with the subtracted difference in output signals being a measure of the applied static acceleration eliminating vibration rectification errors.--

| Column 8, Line 30 | "single-beam resonator" | --single beam resonators-- |
| Column 9, Line 33 | "dual-beam double-ended tuning fork" | --dual beam, double-ended tuning fork-- |

UNITED STATES PATENT AND TRADEMARK OFFICE
CERTIFICATE OF CORRECTION

PATENT NO. : 6,826,960 B2
APPLICATION NO. : 10/214920
DATED : December 7, 2004
INVENTOR(S) : Theo P. Schaad and Jerome M. Paros It is certified that error appears in the above-identified patent and that said Letters Patent is hereby corrected as shown below:

Column 10, Lines 7-11   "32. The measurement system of claim 30 wherein the support members in at least one of the pairs comprise two single vibrating beams and wherein the sensor device comprises a drive mechanism operable to drive the beams out of phase in 180 degrees opposition."   --32. The measurement system of claim 30 wherein the support members in at least one of the pairs comprise two force sensitive single vibrating beams, and wherein the sensor device comprises a drive mechnaism operable to drive the beams out of phase in 180 degrees opposition.--

This certificate supersedes the Certificate of Correction issued January 23, 2007.

Signed and Sealed this

Twenty-fifth Day of March, 2008

JON W. DUDAS
*Director of the United States Patent and Trademark Office*